United States Patent [19]

Capone et al.

[11] Patent Number: 6,143,835
[45] Date of Patent: Nov. 7, 2000

[54] POLYACRYLONITRILE POLYMER TREATMENT

[75] Inventors: Gary J. Capone, Decatur; C. Wayne Emerson, Hartselle; Bruce E. Wade, Decatur, all of Ala.

[73] Assignee: Solutia Inc., St. Louis, Mo.

[21] Appl. No.: 09/054,777

[22] Filed: Apr. 3, 1998

[51] Int. Cl.⁷ ................................................ C08F 120/44
[52] U.S. Cl. ................................ 525/329.1; 525/329.2; 525/329.8; 525/329.7
[58] Field of Search ............................ 525/329.1, 329.2, 525/329.5, 329.7, 329.8, 329.9

[56] References Cited

U.S. PATENT DOCUMENTS

| | | | |
|---|---|---|---|
| 3,672,866 | 6/1972 | Damiano | 71/121 |
| 3,723,571 | 3/1973 | Haskell | 260/836 |
| 3,922,255 | 11/1975 | Koestler et al. | 260/80.78 |
| 3,927,775 | 12/1975 | Horikiri et al. | 264/29 |
| 3,944,638 | 3/1976 | Beatty | 264/5 |
| 3,988,919 | 11/1976 | Talmi et al. | 73/23.1 |
| 4,049,608 | 9/1977 | Steckler et al. | 260/29.6 |
| 4,130,525 | 12/1978 | Kobashi et al. | 260/29.6 |
| 4,138,383 | 2/1979 | Rembaum et al. | 260/29.7 |
| 4,143,203 | 3/1979 | Rigopulos et al. | 428/407 |
| 4,173,695 | 11/1979 | Brenner et al. | 526/332 |
| 4,221,862 | 9/1980 | Naito et al. | 430/536 |
| 4,255,286 | 3/1981 | Berek et al. | 252/448 |
| 4,269,760 | 5/1981 | Wakimoto et al. | 260/42.53 |
| 4,435,524 | 3/1984 | Dinbbergs | 521/65 |
| 4,439,349 | 3/1984 | Everett et al. | 502/180 |
| 4,458,057 | 7/1984 | Basu | 526/88 |

(List continued on next page.)

FOREIGN PATENT DOCUMENTS

| | | | |
|---|---|---|---|
| 451708 | 8/1974 | Australia | 35/3 |
| 212956 | 1/1984 | Czechoslovakia | 35/4 |
| 2324154 | 11/1973 | Germany | 36/3 |
| 4304026 | 9/1993 | Germany | 49/1 |
| 50148292 | 11/1975 | Japan | 61/2 |
| 50148293 | 11/1975 | Japan | 60/2 |
| 59-064511 | 4/1984 | Japan . | |
| 60-103355 | 6/1985 | Japan | 74/3 |
| 61-026505 | 2/1986 | Japan . | |
| 62-270631 | 11/1987 | Japan . | |
| 63-010603 | 1/1988 | Japan . | |
| 63-105035 | 5/1988 | Japan . | |
| 63-142066 | 6/1988 | Japan . | |
| 49054413 | 8/1993 | Japan | 36/6 |
| 50072891 | 9/1993 | Japan . | |
| 57171721 | 9/1993 | Japan | 40/2 |
| 57171722 | 9/1993 | Japan | 40/2 |
| 05139711 | 11/1993 | Japan . | |
| 05254814 | 12/1993 | Japan . | |
| 06256438 | 9/1994 | Japan | 35/4 |
| 06228212 | 12/1994 | Japan | 35/4 |
| 14379414 | 5/1989 | U.S.S.R. . | |
| 1836138 A3 | 8/1993 | U.S.S.R. . | |
| WO 91/00930 | 1/1991 | United Kingdom | C22B 1/20 |
| 2280898 | 5/1995 | United Kingdom . | |
| WO 90/11889 | 10/1990 | WIPO . | |

OTHER PUBLICATIONS

Boucher, E., et al. Effect of Heat Treatment On The Morphology And Structure Of Crystals, Etc. J. Polym. Sci, Part A–2, 1285–96 (1972)., (Abstract Only).

Muratova, I., et al. Study Of The Shape Factor Of Particles Of Vinyl Chloride And Acrylate Powders, Khim. Prom–st., Ser.: Proizvod. Pererab. Plastmass Sint. Smol, 36–40 (1981), (Abstract Only).

Almog, Y., et al. Monodisperse Polymeric Spheres In The Micron Size Range By A single Step Process, Br. Polym. J., 131–6 (1982), (Abstract Only).

Csomorova, K., et al, Polymerization Of Methyl Methacrylate And Carbonization Of Poly (Methyl Methacrylate) In The Presence Of Magnesium Perchlorate, Collect. Czech. Commun. 393–400 (1979), (Abstract Only).

Goto, S., et al, Evaluation Of Microcapsules, J. Microencapsulation 293–304 (1986) (Abstract Only).

Bhattacharyya, B. et al, Application Of Monodisperse Functional And Fluorescent Latex Particles, Polym. News 107–14 (1977), (Abstract Only).

Guyot, A., et al.; Reactive Surfactants in Emulsion Polymerization; Polymer Synthesis, pp. 44–65 (Advances in Polymer Science, vol. III, Springer–Verlag Berlin Heidelberg 1994).

Wade, B., et al.; Polymerization; Acrylic Fiber Technology and Applications, pp. 37–59; (Ed. by James C. Masson, JCM Consulting, Mooresville, North Carolina; Marcel Dekker, Inc. 1995).

Frushour, B.; Acrylic Polymer Characterization in Solid State and Solution; Acrylic Fiber Technology and Applications, pp. 233–242; (Ed. by James C. Masson, JCM Consulting, Mooresville, North Carolina; Marcel Dekker, Inc. 1995).

PCT Search Report for PCT/US99/06784.

*Primary Examiner*—Edward J. Cain

[57] ABSTRACT

The present invention relates to a method for exchanging derivatizing agents onto ionic functional groups, preferably sulfate, sulfonate, and carboxylate functional groups, in a polymer, and then thereby holding these derivatizing agents in place by strong ionic bonds. The ionic functional groups are those currently used in industry to enhance dyeability, and therefore do not present a problem with textile treatments normally encountered in the industry. Polyacrylonitrile polymer is synthesized with an ionic comonomer to obtain a number of dye sites above that required for dying. The sodium or other cation that is ionically bound to the ionic comonomer, as well as the sulfonate and sulfate end groups, is then exchanged with a derivatizing agent. The preferred derivatizing agents comprise a quaternary ammonium compound. Protonated amines, such as tetramethyl ammonium quaternary salt, tetrabutyl ammonium quaternary salt, a quaternary ammonium salt of a dimethyl fatty acid amine, and the protonated primary amines contained in chitosan biopolymer, are successfully exchanged with the counterions on the available sulfate and sulfonate functional groups in acrylic polymers. The derivatizing agent imparts antimicrobial activity to the polymer and can improve rheological properties.

11 Claims, No Drawings

U.S. PATENT DOCUMENTS

| | | | |
|---|---|---|---|
| 4,546,146 | 10/1985 | Kobashi et al. | 524/831 |
| 4,698,413 | 10/1987 | Lynch et al. | 525/328.5 |
| 4,708,870 | 11/1987 | Pardini | 424/81 |
| 4,859,711 | 8/1989 | Jain et al. | 521/56 |
| 4,861,818 | 8/1989 | Timmerman et al. | 524/460 |
| 5,043,407 | 8/1991 | Hasegawa et al. | 526/307.6 |
| 5,059,639 | 10/1991 | Ohkura et al. | 523/205 |
| 5,252,692 | 10/1993 | Lovy et al. | 526/342 |
| 5,314,974 | 5/1994 | Ito et al. | 526/206 |
| 5,356,985 | 10/1994 | Sackmann et al. | 524/460 |
| 5,369,132 | 11/1994 | Ito et al. | 521/31 |
| 5,412,048 | 5/1995 | Longley et al. | 526/212 |
| 5,463,182 | 10/1995 | Manring et al. | 525/330.4 |
| 5,629,375 | 5/1997 | Jenkins et al. | 524/556 |

POLYACRYLONITRILE POLYMER TREATMENT

BACKGROUND OF THE INVENTION

1. Field of the Invention

The present invention relates generally to the fields of synthesis of polyacrylonitrile polymers comprising ionic comonomers and the substitution of active derivatizing agents onto the available sulfate, sulfonate, carboxylate, or their respective acid functional groups. The derivatizing agents can be protonated amines, which displace the sodium, hydronium, or other cation bound to the functional groups, and become strongly bound to the polymer via an ionic bond. The method is useful because, among other reasons, 1) many protonated amines are antimicrobial agents that will impart antimicrobial activity to the polymer, 2) these derivatizing agents remove sodium, which is especially important if the fibers are to be carbonized, 3) the derivatizing agents can strongly affect whether the polymer is hydrophilic or hydrophobic, and 4) these derivatives can improve the rheological properties of the polymer and make microdenier fiber production possible.

2. Description of Related Art

Acrylonitrile and its comonomers are polymerized by any of several well-known free-radical methods. All commercial processes are based on free radical polymerization because it gives the combination of polymerization rate, ease of control, and properties including whiteness, molecular weight, linearity, and the ability to incorporate desired comonomers and, in most cases, dye sites. The most widely used method of polymerization in the acrylic fibers industry is aqueous dispersion polymerization which is a variant of suspension polymerization. Radical fragments generated by redox catalysts in this type of process contain a sulfate or a sulfonate functional group. Polyacrylonitrile particles made by this process tend to grow primarily by agglomeration of smaller particles.

Nearly all acrylic fibers are made from acrylonitrile copolymers containing one or more additional monomers that modify the properties of the fiber. Neutral comonomers including methyl acrylate, methyl methacrylate, or vinyl acetate are used to modify the solubility of the acrylic copolymers in spinning solvents such as dimethyl acetamide, to modify the acrylic fiber morphology, and to improve the rate of diffusion of dyes into the acrylic fiber. Despite its disadvantages of low reactivity and difficulty in polymer control and chain transfer in polymerization, vinyl acetate is increasingly the comonomer of choice for acrylic fibers, primarily because of its low cost.

Dyes attach to the polymer at end groups and where ionic functional groups are available. Generally, fiber dyeability is critically dependent on the molecular weight distribution of the polymer because most acrylic fibers derive their dyeability from sulfonate and sulfate activator and initiator fragments, respectively, at the polymer chain ends. Thus, the dye site content of the fiber without the presence of an ionic comonomer is inversely related to the number average molecular weight of the polymer and very sensitive to the fraction of low molecular weight polymer. With the trend to finer denier fibers where more dye is required to achieve a given color, the need for dye sites is increased. Over the years, many producers have gradually lowered the molecular weight of their polymer to increase dyeability. The total number of dye sites required to be able to dye a full range of shades with cationic dyes is 30 to 50 milli-equivalents per kilogram (meq/kg) depending on the fiber denier and structure. Dry-spun fibers and microdenier fibers require a minimum of 40 meq/kg of dye sites.

Where the number provided by the end groups is inadequate, an ionic comonomer may be used to provide additional dye sites within the polymer structure. Ionic comonomers that contain sulfonate groups, such as sodium p-styrenesulfonate, sodium methallyl sulfonate, sodium p-sulfophenyl methallyl ether, or sodium 2-methyl-2-acrylamidopropane sulfonate, may be added to provide dye sites apart from end groups and to increase hydrophilicity. Carboxylate-containing comonomers such as itaconic acid and acrylic acid have also been employed as dye receptors. These dye site, or ionic, comonomers contain a carboxylic acid or sulfonate functional group and a polymerizeable vinyl hydrocarbon functional group.

It is known that protonated amines can impart antimicrobial activity to polyacrylonitrile polymer. Early technology involved applying a protonated amine or other antimicrobial agent topically. The topical treatment was subject to degradation by abrasion and by washing cycles. Another treatment involved binding an alkoxysilane quaternary ammonium salt from a methanol solution to fibers or to finished product. The bond was by hydrolysis and condensation of the alkoxysilane with hydroxyl groups in the fiber. But acrylic fibers do not contain appreciable hydroxyl groups to which the alkoxysilane groups can bind. There were also problems of interactions with emulsion-based finishes used in the textile industry and deactivation by soaps.

Pardini in U.S. Pat. No. 4,708,870 suggested that non-fugitive antimicrobial activity can be imparted into acrylic polymers by copolymerizing a comonomer that contains a protonated amine. Such monomers include, for instance, dimethylamino-ethylmethacrylate. Benefits of this treatment were that the antimicrobial agent was covalently bound to the polymer and was therefore not fugitive, and that the antimicrobial agent was present throughout the polymer. A problem with this technology is that the protonated amines are subject to attack from subsequent textile treatments. For instance, cationic antistatic agents (antistats) were required for this polymer as anionic antistats would react with the protonated amine. There was also the problem of wasted antimicrobial monomer, because many applications do not need antimicrobial agents within a fiber. Finally, the antimicrobial activity was fixed, both in the compound used and in the quantity incorporated, upon making the polymer. Different final uses require different degrees of antimicrobial activity and incorporating the antimicrobial agents when the polymer was being made did not provide the flexibility needed by industry.

SUMMARY OF THE INVENTION

The present invention relates to a method for ionically bonding derivatizing agents to polymers. The polymers must comprise ionic functional groups, preferably sulfate, sulfonate, carboxylate, or their respective acids functional groups. The derivatizing agents are then exchanged onto at least some of these ionic functional groups, thereby holding these derivatizing agents in place by strong ionic bonds. The ionic functional groups include those currently used in industry to enhance dyeability, and therefore do not present a problem with textile treatments normally encountered in the industry. Polyacrylonitrile polymer is synthesized with a functional ionic comonomer to obtain a number of dye sites above that required for dying. The sodium ion, hydronium ion, or other cations that are ionically bound to the sulfonate, sulfate, or carboxylic acid containing comonomers are then exchanged with a derivatizing agent.

The preferred derivatizing agents comprise a protonated amine compound. Substitution of the derivatizing agent onto the ionic functional group has the effect of both eliminating the counterion from the polymer and of strongly binding the derivatizing agent onto available ionic groups. Protonated amines, such as tetramethyl ammonium quaternary salt, tetrabutyl ammonium quaternary salt, Larostat 264A which is the quaternary ammonium salt of a dimethyl fatty acid amine made from soybean oil, and the protonated primary amines contained in chitosan biopolymer, are successfully exchanged with the counterions on the available ionic functional groups in acrylic polymers.

The derivatizing agents that are exchanged onto the ionic functional groups can have various effects, depending on the properties of the derivatizing agent. It is known that certain quaternary ammonium salts, in particular protonated amines, exhibit antimicrobial effects. Some derivatizing agents impart antimicrobial activity, some improve Theological properties of the polymer, and some make the polymer less hydrophobic. These derivatizing agents can have any number of functions or combination of functions; some compatabilize polymers to create polymers which can be spun into shaped articles, (fibers, films), even though the separate polymers by themselves will not form a shaped article with good strength.

Derivatization of the ionic functional carboxylate, sulfate, sulfonate, or their respective acid groups in acrylic polymers is accomplished by chemical exchange, for example by washing or soaking. This process can be performed on the manufactured product garments, the yarn, the polymer during the process of making fibers or yarn, or the acrylic polymer in solution during manufacturing, filtering, washing or stretching processes. The derivatizing agent can be contained in an aqueous solution, suspension, or emulsion. Washing or soaking the polymer can be performed during processing of the polymer, processing the polymer into fibers, or during subsequent treatment of the fibers. Different derivatizing agents can be incorporated at different times. The preferred method will depend in large measure on the desired end product.

If the end product requires that most of the available dye sites are exchanged with the derivatizing agent, then the exchange should occur with the protonated amine containing compounds at a temperature near, i.e., within about 5 degrees Centigrade, or above the wet glass transition point of the acrylic polymer. This facilitates diffusion of the derivatizing agents into the polymer. Incorporation of neutral comonomers into the polymer also facilitates diffusion of derivatizing agents into the polymer. This exchange at elevated temperature is also the preferred method if the goal of the treatment is to alter Theological properties of the polymer, such as to improve stretch-ability to make microdenier fibers.

In many instances the polymer may not be treated until it is made into yarn or even into final products or garments. It is a common practice in industry to incorporate dye into yarn, fabrics and garments by batch treatment, which may, but need not, use high pressure and elevated temperatures. The derivatizing agents can be exchanged onto the polymer at this stage, competing with dye for available sites. Topical treatments to acrylic fiber, such as application of a protonated amine containing compound in a finish bath or in a fiber wash bath, are not as efficient at incorporating derivatizing agent as are methods performed prior to formulating the polymer into yarn. This is nevertheless a preferred method when the finished product does not require that all available sites within the polymer be exchanged.

There is usually an insufficient number of dye sites available in a polyacrylonitrile polymer to accommodate both the desired dye incorporation and the desired derivatizing agent incorporation. To provide additional dye sites, an ionic functional comonomer is incorporated into the polymer at a concentration above that used to achieve dyeability. The preferred dye site contains a sulfonate ($-SO_3X$, where X is any suitable cation and is often an alkali metal) which is a strong acid functional group. Carboxylic acid or carboxylate dye sites are considered weak acid functional groups and tend to be more pH sensitive to substitution of derivatizing agents. Nevertheless, carboxylate-containing ionic comonomers, in particular itaconic acid, may be preferred for some applications because of those very properties or because of the relative costs of carboxylate-containing monomers versus sulfonate-based monomers.

Acrylic polymers with a high comonomer content of ionic containing functional groups are especially desirable as they can be used to obtain a higher loading of the derivatizing agent. If the concentration of the functional group is in the range of 350 meq/kg of polymer, for example, greater than 1 weight percent of chitosan can be incorporated into and ionically bound to the polymer. Amazingly, the chitosan bound polymer can be spun into shaped articles using standard, known organic and inorganic solvents and coagulants to form materials with good strength. The chitosan polymer by itself cannot be spun into shaped articles, (fibers, films), with standard solvents and coagulants but only create a gel mass.

Chemical exchange with protonated amines provides an effective way to remove counterions such as sodium in acrylic polymers, to impart antimicrobial activity, and to improve rheological properties. Over the range of materials tested, the degree of substitution seems to go up as the hydrocarbon character of the derivatizing agent increases. One method of inferring the degree of substitution is to measure the reduction of the sodium content of the polymer during treatment, presuming the ionic comonomers originally had sodium counterions. Under fairly similar circumstances, a tetramethyl ammonium hydroxide solution removed 56% of the sodium from a polymer. A tetrabutyl ammonium hydroxide solution removed 80% of the sodium from a polymer. A dimethyl fatty acid amine solution removed 87% of the sodium from a polymer.

Larostat 264A (also herein called Larostat), available from Mazer Chemicals, Division of PPG Industries, Inc., Gurnee, Ill., which is the quaternary ammonium salt of a dimethyl fatty acid amine made from soybean oil, is a preferred derivatizing agent for each of many purposes. Larostat is an excellent agent to remove sodium or other metal cations from carboxylate, sulfate, or sulfonate groups in the polymer. Treatment of polyacrylonitrile polymers that contained approximately 4–6% of vinyl acetate and between about 0.6 and about 5% sodium p-sulfophenyl methallyl ether with Larostat was found to displace about 87% of the sodium in a single exchange step if the treatment is made at the glass transition temperature and the polymer particles have not been formed into fiber.

Larostat is a preferred derivatizing agent for changing the wettability characteristics of a polymer, changing the hydrophilic nature of a polyacrylonitrile particle containing surfmers to a strongly hydrophobic nature. Both the strong hydrocarbon character of the derivatizing agent and the high degree of substitution probably account for this shift in wettability.

Larostat is a preferred derivatizing agent to improve the Theological properties of polyacrylonitrile polymer.

Surprisingly, Larostat seems to reduce amorphous density and improve the range of fiber orientation (stretch ratio) during fiber formation and drawing. Larostat substitution improved the spinnability of a polymer that contains about 4% vinyl acetate, 5% sodium p-sulfophenyl methallyl ether, and the balance acrylonitrile. Nearly an 8× wet gel stretch is attained with exchanged polymer, when normally less than a 4× wet gel stretch is attained from the same polymer without the substitution of Larostat, from a dope containing 24.8 to 25.2 weight percent polymer solids in dimethyl acetamide solvent. This improvement in the range of fiber orientation makes microdenier fiber production possible.

Larostat, as a monofunctional protonated amine compound, acts as a theological aid by adding to the weight of the polymer without significantly increasing the polymer solution viscosity.

Larostat substitution has also been found to be beneficial for carbonization processes. The presence of Larostat in the polymer broadens the exotherm that occurs in stabilization prior to carbonization and can help prevent polymer particle to particle or fiber to fiber fusion during stabilization leading to carbon formation.

Finally, Larostat has also been found to impart antimicrobial activity to the exchanged polymer, even after normal washing of the fiber made from the derivatized acrylic polymer.

Another preferred derivatizing agent is chitosan. Cationic chitosan has been found to impart antimicrobial activity to the exchanged polymer, even after normal washing of the fiber made from the derivatized acrylic polymer. A monofunctional protonated amine compound acts as a theological aid by adding to the weight of the polymer, but not significantly increasing the polymer solution viscosity. On the other hand, multifunctional protonated amine compounds such as the chitosan biopolymer act as a cross-linking agent in acrylic polymers increasing solution viscosity with increased levels of loading.

The preferred method of exchanging out the sodium or other cation from the polymer is by washing the polymer or by chemical exchange with the acrylic polymer in solution at a temperature near or above the wet glass transition point of the polymer. The glass transition is the temperature range over which a glassy polymer becomes rubbery. Other changes that occur at the glass transition are pronounced increases in specific volume, heat capacity, and diffusion rate of absorbed molecules. In dyeing operations it is often necessary to be at the glass transition of the wet fiber so that the dye molecules can diffuse into the fiber and reach the dye sites. This elevated temperature and the change in the properties of the polymer facilitate diffusion of dyes and derivatizing agents into and out of the polymer particle. The incorporation of neutral comonomers, preferably vinyl acetate, into the polymer as an additional comonomer also facilitates diffusion into and out of the polymer.

In applications where the desired treatment is limited to the near-surface dye sites, lower temperatures and less soaking time may be required.

The substitution of the derivatizing agents onto the ionic comonomers can occur at any time in the production of a fabric, including treating yarns or even manufactured articles. In some limited applications, the sodium cation may be removed from the ionic monomers prior to polymerization.

In some applications it may be desirable to substitute several compounds onto the polymer. Some compounds may be incorporated to improve rheological properties, while others are incorporated to improve antimicrobial properties. These substitutions may be done simultaneously or in series. The substitution may take place in conjunction with dyeing operations.

DESCRIPTION OF ILLUSTRATIVE EMBODIMENTS

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

In this example polymer particles containing about 5 weight percent sodium p-sulfophenyl methallyl ether are exchanged with Larostat and the quantity of sodium removed from the polymer particle is determined. The theoretical amount of Larostat needed to exchange the sodium in the polymer was 0.286 grams of 35% by weight Larostat per gram of polymer. Two grams of deionized water were also used per gram of polymer. The water and Larostat are brought to a boil and the polymer is added. The heat is removed and the solution was cooled over 15 minutes. The polymer was then filtered and the liquid discarded. An additional six grams of deionized water was used to wash each gram of polymer on the filter. The unwashed polymer had about 5100 parts per million by weight of sodium in the polymer, while the exchanged polymer contained only 636 parts per million by weight of sodium. Approximately 87% of the sodium was removed, and was presumably substituted with Larostat.

It was surprising that the polymer particles, which are normally a very hydrophilic, made a dramatic switch to being hydrophobic after the exchange with Larostat.

Surprisingly, Larostat seems to improve the range of fiber orientation (stretch ratio) during fiber formation and drawing. Larostat substitution improved the spinnability of this polymer. Nearly an 8× wet gel stretch is attained with exchanged polymer, when normally less than a 4× wet gel stretch is attained from the same polymer without the substitution of Larostat, from a dope containing 24.8 to 25.2 weight percent polymer solids in dimethyl acetamide solvent. This improvement in the range of fiber orientation makes microdenier fiber production possible.

EXAMPLE 2

In this example polymer particles containing sodium p-sulfophenyl methallyl ether are exchanged with Larostat and the quantity of sodium removed from the polymer particle is determined. The theoretical amount of Larostat needed to exchange the sodium in the polymer was 0.077 grams of 35% by weight Larostat per gram of polymer. Three grams of deionized water were also used per gram of polymer. The water and Larostat are brought to a boil and the polymer is added. The heat is removed and the solution was cooled. The polymer was then filtered and the liquid discarded. An additional six grams of deionized water was used to wash each gram of polymer on the filter. The unwashed polymer had about 1150 parts per million by weight of sodium in the polymer, while the exchanged polymer contained only 142 parts per million by weight of sodium. Approximately 87% of the sodium was removed, and was presumably substituted with Larostat.

EXAMPLE 3

In this example polymer particles containing about 5 weight percent sodium p-sulfophenyl methallyl ether are exchanged with neutralized tetramethyl ammonium hydroxide which has been brought down to a pH of 6–7 with 1 N sulfuric acid. The theoretical amount of tetramethyl ammonium hydroxide needed to exchange the sodium in the polymer is 0.00008 liters of 25% by weight tetramethyl ammonium hydroxide per gram of polymer. Two grams of deionized water are also used per gram of polymer. The water is brought to a boil and the neutralized tetramethyl ammonium hydroxide and polymer are added. The heat is removed and the solution was cooled. The polymer was then filtered and the liquid discarded. The filtered polymer was then washed with deionized water. The polymer was white after washing. The exchange with tetramethyl ammonium hydroxide removed about 56% of the sodium, suggesting only about 56% of the tetramethyl ammonium hydroxide was incorporated into the polymer.

EXAMPLE 4

In this example polymer particles containing about 5 weight percent sodium p-sulfophenyl methallyl ether are exchanged with neutralized tetrabutyl ammonium hydroxide which has been brought down to a pH of 6–7 with 1 N sulfuric acid. Deionized water was boiled. The theoretical amount of tetrabutyl ammonium hydroxide was mixed into two grams of deionized water for each gram of polymer. The water is brought to a boil and the tetramethyl ammonium hydroxide and polymer are added. The heat is removed and the solution was cooled. The polymer was then filtered and the liquid discarded. The filtered polymer was then washed with deionized water. The polymer was white after washing. The exchange with tetrabutyl ammonium hydroxide removed about 80% of the sodium, suggesting about 80% of the tetrabutyl ammonium hydroxide was incorporated into the polymer.

EXAMPLE 5

In this example polymer particles containing about 5 weight percent sodium p-sulfophenyl methallyl ether are exchanged with chitosan. Chitosan is a biopolymer that contains multiple protonated amine functional groups. Chitosan powder was dissolved in an aqueous acetic acid solution so that the final solution contained 1% by weight each of acetic acid and of chitosan. A total of 1500 grams of deionized water was boiled. To this water was added 900 grams of the chitosan solution, which contained 9 grams of chitosan, and the solution was brought to a boil. The pH of the solution was maintained at 4.2. A total of 1000 grams of polymer was then added, and the solution was allowed to cool to about 75 degrees Centigrade over the following 15 minutes. The polymer was then filtered and the liquid discarded. The filtered polymer was washed with deionized water. The exchange with dissolved chitosan biopolymer removed about 22% of the sodium, suggesting that at most only about 22% of the chitosan was incorporated into the polymer.

EXAMPLE 6

In this example polymer particles containing about 0.6% by weight sodium p-sulfophenyl methallyl ether are exchanged with chitosan. Chitosan powder was dissolved in an aqueous acetic acid solution so that the final solution contained 1% by weight each of acetic acid and of chitosan. A total of 1500 grams of deionized water was boiled. To this water was added 900 grams of the chitosan solution, which contained 9 grams of chitosan, and the solution was brought to a boil. The pH of the solution was maintained at 4.1. A total of 1000 grams of polymer was then added, and the solution was allowed to cool to about 75 degrees Centigrade over the following 15 minutes. The polymer was then filtered and the liquid discarded. The filtered polymer was washed with deionized water. The exchange with dissolved chitosan biopolymer removed about 53% of the sodium, suggesting that at most only about 53% of the chitosan was incorporated into the polymer.

EXAMPLE 7

In this example four separate polymer samples were tested. The polymers were prepared from polyacrylonitrile, vinyl acetate, and itaconic acid. Two samples, numbered 1 and 2, were polymerized where the normal sodium counterion was associated with the ionic monomers. Two samples, numbered 3 and 4, were polymerized where the counterion associated with the ionic monomer was ammonium. Chitosan powder was dissolved in an aqueous acetic acid solution so that the final solution contained 1% by weight each of acetic acid and of chitosan. For each polymer, a total of 1500 grams of deionized water was boiled. To this water was added 700 grams of the chitosan solution, which contained 7 grams of chitosan, and the solution was brought to a boil. A total of 500 grams of the respective polymer was then added, and the solution was allowed to cool to about 80 degrees Centigrade over the following 15 minutes. The polymer was then filtered and the liquid discarded. The filtered polymer was washed with deionized water. Because of the lack of sodium on two samples, the amount of chitosan substituted onto the polymer was measured by wet chemical methods. The results are shown in Table 1 below. There was essentially no difference in the quantity of chitosan biopolymer incorporated in each of the samples. The samples numbered 1 and 2, that had been prepared with sodium counterions, exhibited just over 75% removal of sodium from the polymers. The chitosan substitutes onto the carboxylate functional groups on the itaconic acid in quantities that are strongly antimicrobial.

TABLE 1

Chitosan Substitution Onto Itaconic Acid

| Run No. | Vinyl acetate, wt. % | Itaconic acid, wt. % | pH during substitution | Chitosan added, direct measure (wt. %) |
|---|---|---|---|---|
| 1 | 1.7 | 3.1 | 2.7 | 1.32 |
| 2 | 2.3 | 2.5 | 2.8 | 1.46 |
| 3 | 1.8 | 2.6 | 4.0 | 1.39 |
| 4 | 2.7 | 2.3 | 4.4 | 1.31 |

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. It will also be apparent that this process can be performed on yarn or finished products, or in conjunction with other processes such as dying. All such similar substitutes and modifications apparent to those skilled in the art are deemed to be within the spirit, scope and concept of the invention as defined by the appended claims.

What is claimed is:

1. A method for modifying a polymer that comprises ionic functional groups having counterions ionically bonded thereto, the method comprising: contacting the polymer with a derivatizing agent selected from the group consisting of chitin or chitosan biopolymer, in order for the derivatizing agent to substitute for the counterions on the ionic functional groups, thereby ionically bonding the derivatizing agent to the polymer.

2. The method of claim 1, wherein the ionic functional groups comprise sulfate, sulfonate, or carboxylate functional groups, or acid thereof.

3. The method of claim 1, wherein the polymer comprises polyacrylonitrile.

4. The method of claim 1, wherein the polymer comprises an ionic comonomer or comonomers in an amount effective to increase the quantity of available ionic functional groups beyond that required for dyeability.

5. The method of claim 4, wherein the ionic comonomer comprises methallyl sulfonate and a cation.

6. The method of claim 4, wherein the ionic comonomer comprises itaconic acid, a salt of itaconic acid, or a mixture thereof.

7. The method of claim 4, wherein the ionic comonomer comprises a cation and p-styrenesulfonate, p-sulfophenyl methallyl ether, sodium 2-methyl-2-acrylamidopropane sulfonate, or a mixture thereof.

8. The method of claim 1, wherein the derivatizing agent is contained in an aqueous solution, suspension, or emulsion.

9. The method of claim 8, wherein the temperature of the solution is near or above the glass transition temperature of the polymer.

10. The method of claim 1, wherein the polymer comprises polyacrylonitrile and a neutral comonomer.

11. The product of the process of claim 1.

* * * * *

UNITED STATES PATENT AND TRADEMARK OFFICE
CERTIFICATE OF CORRECTION

PATENT NO. : 6,143,835
DATED : November 7, 2000
INVENTOR(S) : Gary J. Capone, C. Wayne Emerson, Bruce E. Wade It is certified that error appears in the above-identified patent and that said Letters Patent is hereby corrected as shown below:

Column 3,
Line 17-18, delete "Theological" and insert --rheological--.

Column 3,
Line 51, delete "Theological" and insert --rheological--.

Column 4,
Line 67, delete "Theological" and insert --rheological--.

Column 5,
Line 14, delete "theological" and insert --rheological--.
Line 32, delete "theological" and insert --rheological--.

Signed and Sealed this

Twelfth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,143,835
DATED : November 7, 2000
INVENTOR(S) : Gary J. Capone, C. Wayne Emerson, Bruce E. Wade It is certified that error appears in the above-identified patent and that said Letters Patent is hereby corrected as shown below:

Column 3,
Line 17-18, delete "Theological" and insert --rheological--.

Column 3,
Line 51, delete "Theological" and insert --rheological--.

Column 4,
Line 67, delete "Theological" and insert --rheological--.

Column 5,
Line 14, delete "theological" and insert --rheological--.
Line 32, delete "theological" and insert --rheological--.

Signed and Sealed this

Twenty-sixth Day of June, 2001

*Attest:*

*Attesting Officer*

NICHOLAS P. GODICI
*Acting Director of the United States Patent and Trademark Office*